(12) United States Patent
Barkic et al.

(10) Patent No.: US 9,812,921 B2
(45) Date of Patent: Nov. 7, 2017

(54) APPARATUS FOR OSCILLATION-DECOUPLED MOUNTING OF AN ELECTRIC MOTOR, IN PARTICULAR A BLOWER MOTOR

(75) Inventors: Dubravko Barkic, Illingen (DE); Samir Mahfoudh, Buehl (DE); Markus Rudigier, Offenburg (DE)

(73) Assignee: Robert Bosch GmbH, Stuttgart (DE)

( * ) Notice: Subject to any disclaimer, the term of this patent is extended or adjusted under 35 U.S.C. 154(b) by 965 days.

(21) Appl. No.: 13/825,585

(22) PCT Filed: Aug. 2, 2011

(86) PCT No.: PCT/EP2011/063324
§ 371 (c)(1),
(2), (4) Date: Sep. 3, 2013

(87) PCT Pub. No.: WO2012/038132
PCT Pub. Date: Mar. 29, 2012

(65) Prior Publication Data
US 2013/0328421 A1 Dec. 12, 2013

(30) Foreign Application Priority Data
Sep. 22, 2010 (DE) .................. 10 2010 041 177

(51) Int. Cl.
*F16F 1/373* (2006.01)
*F16F 1/38* (2006.01)
(Continued)

(52) U.S. Cl.
CPC ............ *H02K 5/24* (2013.01); *F04D 27/008* (2013.01); *F04D 29/668* (2013.01); *F16F 1/373* (2013.01); *F16F 1/38* (2013.01); *F16F 15/12* (2013.01)

(58) Field of Classification Search
CPC .. H02K 1/18; H02K 5/24; H02K 5/04; H02K 5/26; F16F 1/373; F16F 1/38;
(Continued)

(56) References Cited

U.S. PATENT DOCUMENTS 6,098,948 A * 8/2000 Boucheret .................. 248/603
6,286,782 B1 * 9/2001 Bansemir et al. ......... 244/17.11
(Continued)

FOREIGN PATENT DOCUMENTS

CN 201113636 9/2008
DE 19730810 2/1998
(Continued)

OTHER PUBLICATIONS

Machine translation of DE 100 54 556 retrieved from EPO.*
(Continued)

*Primary Examiner* — John K Kim
*Assistant Examiner* — Minki Chang
(74) *Attorney, Agent, or Firm* — Michael Best & Friedrich LLP

(57) ABSTRACT

It is known to mount an electric motor (1), in particular a blower motor, with oscillation decoupling. The electric motor (1) has a motor housing (4), in particular a pole housing, which has at least one connecting lug (10), which protrudes radially from the motor housing (4) and on which a decoupling element (20) is fitted, via which decoupling element the motor housing (4) is supported on an outer housing (5, 6). In order to rule out the risk of a collision between the connecting lug (10) and the outer housing (5, 6), the invention proposes an apparatus for oscillation-decoupled mounting, in which the decoupling element (20) surrounds the connecting lug (10; 11, 12) in the form of a sleeve with a casing part (21), wherein the casing part (21) is supported, via at least one web (30, 31; 40, 41; 50, 51; 55,
(Continued)

56), on an outer part (26), which surrounds the casing part (21) in the form of a frame and is accommodated in the outer housing (5, 6), which is preferably formed in two parts. The apparatus for oscillation-decoupled mounting of an electric motor is intended in particular for blower motors of motor vehicle air conditioning systems.

20 Claims, 6 Drawing Sheets

(51) Int. Cl.
  *F16F 15/12* (2006.01)
  *H02K 5/24* (2006.01)
  *F04D 27/00* (2006.01)
  *F04D 29/66* (2006.01)

(58) Field of Classification Search
  CPC ...... F16F 1/3807; F16F 1/3835; F16F 1/3842; F16F 7/00; F16F 7/003; F16F 7/12; F16F 15/00; F16F 15/10; F16F 15/12
  USPC ........ 310/50, 51, 89, 91; 248/610, 611, 612, 248/613, 638; 174/50, 520; 439/282
  See application file for complete search history.

(56) References Cited

U.S. PATENT DOCUMENTS

| | | | |
|---|---|---|---|
| 6,676,463 B2 * | 1/2004 | Le Bert et al. | 440/6 |
| 8,091,450 B2 * | 1/2012 | Manzoor et al. | 74/574.4 |
| 8,596,596 B2 * | 12/2013 | Naji et al. | 248/224.7 |
| 9,033,124 B2 * | 5/2015 | Semura et al. | 188/379 |
| 2007/0001522 A1 * | 1/2007 | Nitzsche | H02K 5/24 |
| | | | 310/51 |

FOREIGN PATENT DOCUMENTS

| | | | |
|---|---|---|---|
| DE | 9422144 | 4/1998 | |
| DE | 19942953 | 3/2000 | |
| DE | 10054556 | 5/2002 | |
| DE | 10054556 A1 * | 5/2002 | ......... B60H 1/00521 |
| FR | 2711459 | 4/1995 | |

OTHER PUBLICATIONS

DE 100 54 556, English machine translation on 2016, 4, 26.*
International Search Report for Application No. PCT/EP2011/063324 dated Nov. 28, 2011 (English Translation and Original, 6 pages).

* cited by examiner

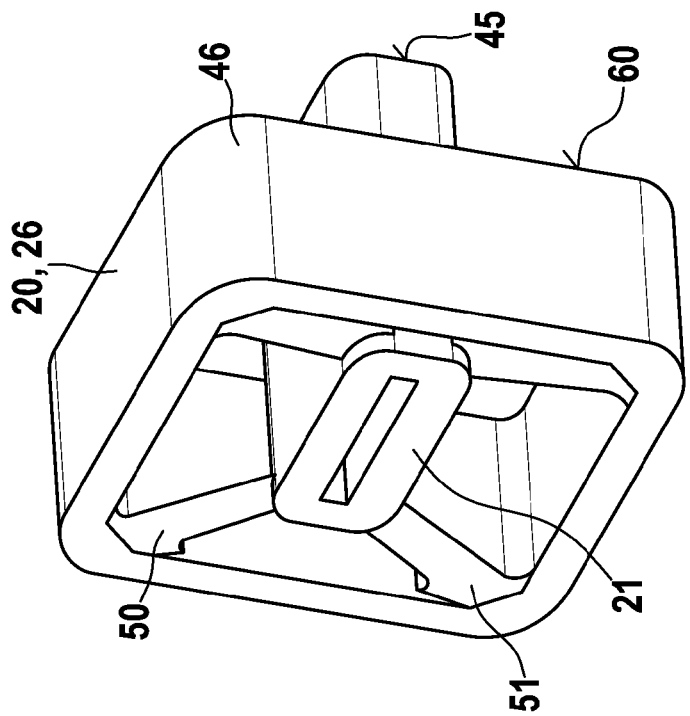
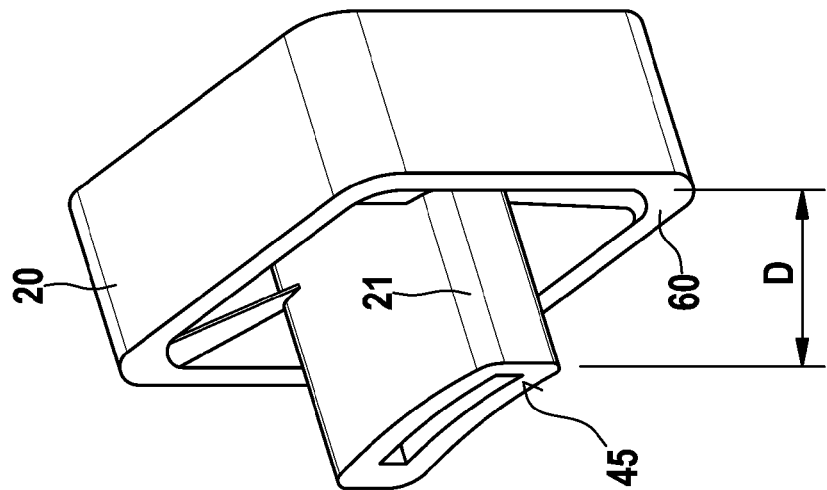
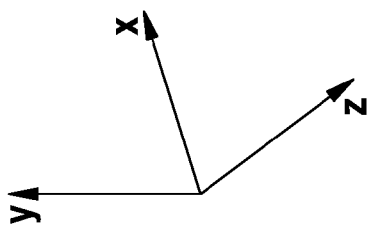
Fig. 9b
Fig. 9a

APPARATUS FOR OSCILLATION-DECOUPLED MOUNTING OF AN ELECTRIC MOTOR, IN PARTICULAR A BLOWER MOTOR

BACKGROUND OF THE INVENTION

The present invention relates to an apparatus for the oscillation-decoupled mounting of an electric motor, in particular a blower motor. The electric motor has a motor housing, in particular a pole housing, which has at least one connecting lug, which protrudes radially from the motor housing and on which a decoupling element is fitted, via which decoupling element the motor housing is supported on an outer housing.

The decoupling elements are inserted as resilient intermediate layers between a motor housing, in particular a pole housing of the electric motor, and the attachment points of the motor housing in an outer housing which surrounds said motor housing, is preferably formed in two parts and is made from plastic. The decoupling elements act as rubber springs and are designed to achieve a low-vibration and noise-damping effect during the operation of the electric motor; however, when the operating temperature of the electric motor is high, the rigidity of the installed decoupling elements significantly decreases. A severe deformation of the decoupling elements can then result, wherein the risk of a collision between connecting lugs and outer housing arises, which can lead to significant noise development, the reduced functionality of the electric motor and even in the worst-case scenario to a breakdown of the electric motor.

SUMMARY OF THE INVENTION

The apparatus according to the invention for mounting an electric motor, in particular a blower motor, with oscillation decoupling has in contrast the advantage that a risk of collision of connecting lugs and outer housing can be reliably ruled out even when the decoupling elements are severely deformed. A proper functioning of the electric motor is guaranteed, wherein a low-noise operation is simultaneously ensured even at high operating temperatures by means of the decoupling elements.

A good decoupling and oscillation damping result if at least two webs are provided, which extend in a longitudinal direction of the electric motor outward from the rectangulary configured casing part to the outer part of the decoupling element.

In order to improve the decoupling and oscillation damping and in order to be as independent as possible of a mounting position of the electric motor, it is advantageous to provide two further transverse webs which extend transversely to the longitudinal direction of the electric motor outward from the casing part to the outer part of the decoupling element.

In an advantageous embodiment, diagonal webs can also be provided, which start at the rectangularly configured casing part and extend to the outer part of the decoupling element.

In an advantageous embodiment, diagonal webs can be provided from a point of origin at the midpoint of a transverse wall of the rectangularly configured casing part to the outer part of the decoupling element.

In order to maintain a higher translational resilience of the decoupling element in the spatial directions, it is advantageous to configure the casing part with respect to the outer part in such a manner that the casing part accommodating the connecting lug protrudes from a plane spanned by the outer part. A simple mounting of the decoupling element to the connecting lug advantageously results if the receiving opening of the sleeve-shaped casing part is designed in a continuous manner.

In a modification to the improvement in mounting and in order to obtain a good support of the decoupling element prior to complete assembly in the housing module, the casing part can be fitted with an additional connecting web, wherein the connecting lug is then designed to be divided up into two retaining lugs, which in turn engage into two receiving openings cut out of the casing part.

For a simple fitting of the outer part in the outer housing, said outer housing advantageously has a square, rectangular or round shape.

BRIEF DESCRIPTION OF THE DRAWINGS

Exemplary embodiments of the invention are described in detail in the following description and are further clarified with the aid of the drawings.

In the drawings:

FIG. 8 shows a perspective view of the decoupling element pursuant to a sixth exemplary embodiment and FIGS. 9a, 9b show lateral views in perspective depiction of the decoupling element pursuant to a seventh exemplary embodiment.

DETAILED DESCRIPTION

Figure 1:
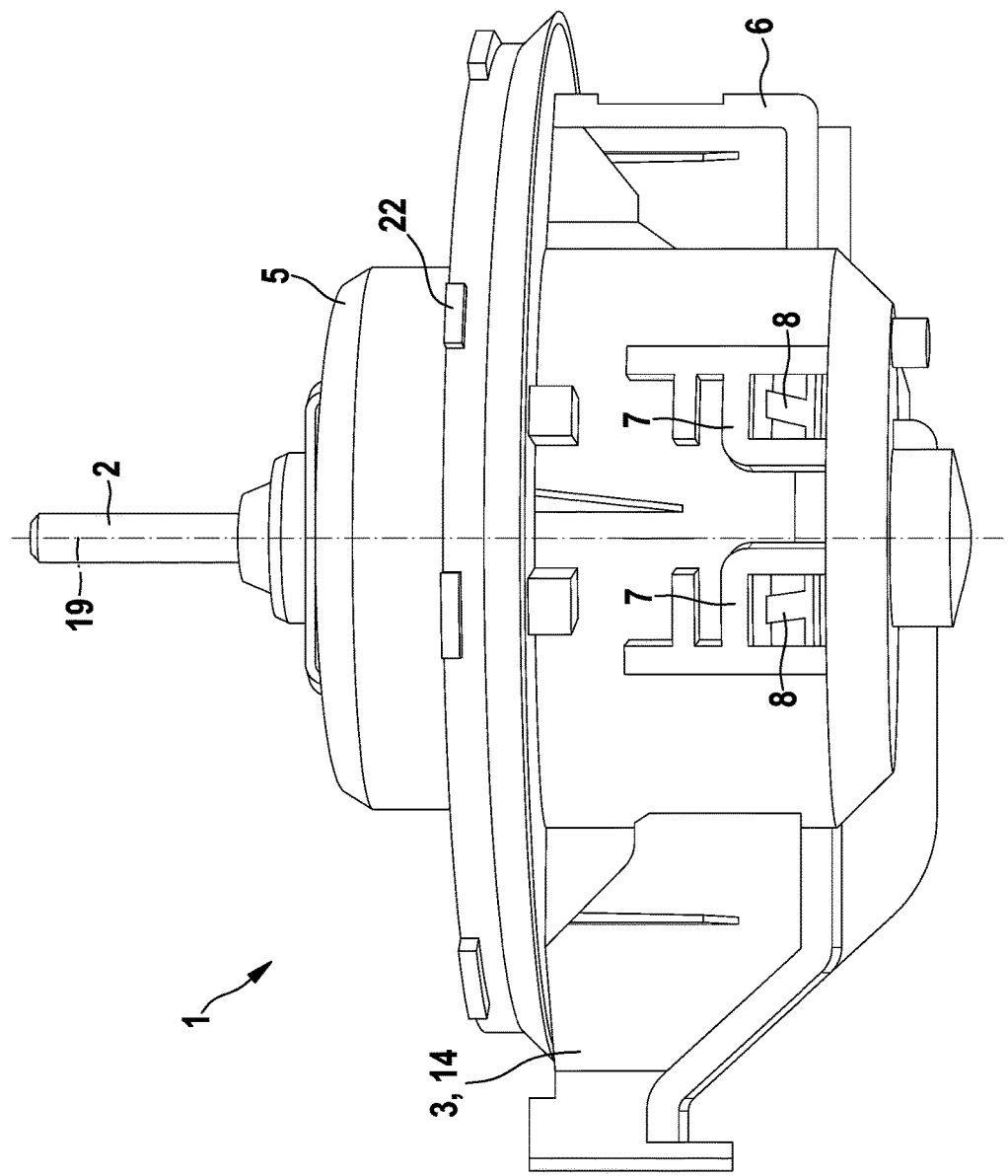
FIG. 1 shows a perspective view of a fan module with an installed electric motor.

FIG. 1 shows an electric motor 1 as it is used in an air-conditioning fan of a motor vehicle. The electric motor 1 drives a rotor or, respectively, a rotor shaft 2 in a known manner, on which a radially compressing fan wheel, which is not described here in detail, is mounted, said fan wheel generating an air flow in a fan duct. The electric motor 1 serving as blower motor is mounted in the fan duct, via which the vehicle interior is then supplied with fresh air. The electric motor 1 is part of a blower module 3 depicted in FIG. 1. The electric motor 1 belongs to the assembly of the blower module 3, the former being preferably embodied as a permanently self-excited DC motor. The electric motor 1 has a pole housing not depicted in FIG. 2, which is referred to below as a motor housing 4, which is embedded in a plastic housing, referred to below as outer housing 5, 6, via three connecting points. The motor housing 4 comprises in a known manner in the interior thereof a plurality of permanent magnets as well as a rotor (armature) having a rotor shaft 2. The outer housing is preferably formed in two parts, consisting of a housing longitudinal part 5 and a cover part 6 and surrounds or encapsulates the motor housing 4.

Figure 2:
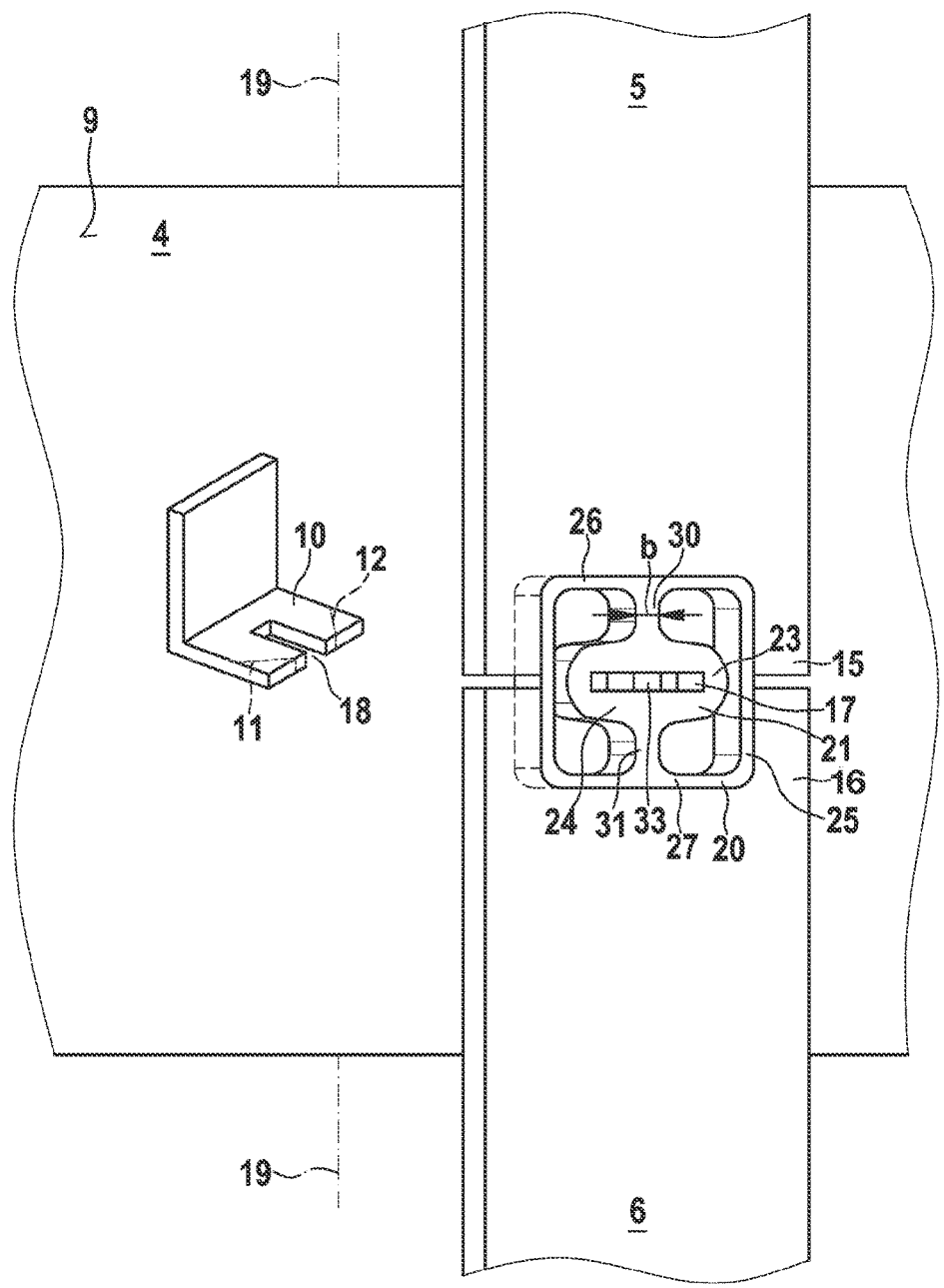
FIG. 2 shows a perspective view of the decoupling element pursuant to a first exemplary embodiment prior to being placed onto the connecting lug on the pole housing and indicated housing receptacles.

The mounting of the motor housing 4 or, respectively, pole housing in the plastic outer housing 5, 6 preferably takes place via three connecting lugs 10. In FIG. 2, a single connecting lug 10 of the motor housing 4 is shown in a schematically simplified depiction prior to assembly with the decoupling element 20 designed according to the invention. The preferably three connecting lugs 10 are formed from the motor housing 4 so as, for example, to be canted or are provided in the form of outward-opening lugs on the sheet-steel strip of the motor housing 4. The connecting lugs 10 or, respectively, retaining lugs for the decoupling element 20 protrude substantially in the radial direction from the motor housing 4 transversely to a longitudinal axis 19 of the electric motor 1. The connecting lugs 10 are preferably disposed asymmetrically across the circumference of the motor housing 4. The connecting lug 10 is itself divided, for example, into two retaining lugs 11, 12 so that a slot 18 is left open between the retaining lugs 11. The retaining lugs 11, 12 virtually form the prongs of a fork. It is also possible, as indicated by a dashed line, to design an undivided connecting lug 10 or, respectively, to design the individual retaining lugs 11, 12 chamfered on the outside. The connecting lugs 10 serve in each case to connect a decoupling element 20 which surrounds the connecting lug 10 or the two retaining lugs 11, 12 with a sleeve-shaped casing part 21. The casing part 21 forms a rectangular receiving opening 17 or as it were the receiving slot for mounting the decoupling element 20 onto the connecting lug 10. The receiving slot is, for example, not configured in a continuous manner; and therefore the decoupling element 20 can be reliably fitted to the two retaining lugs 11, 12 via a connecting web 33 in the middle of the sleeve-shaped casing part 21, wherein the connecting web 33 is accommodated in the slot 18 between said two retaining lugs 11, 12. The receiving opening 17 is divided into two parts by means of the connecting web 33.

Figure 3:
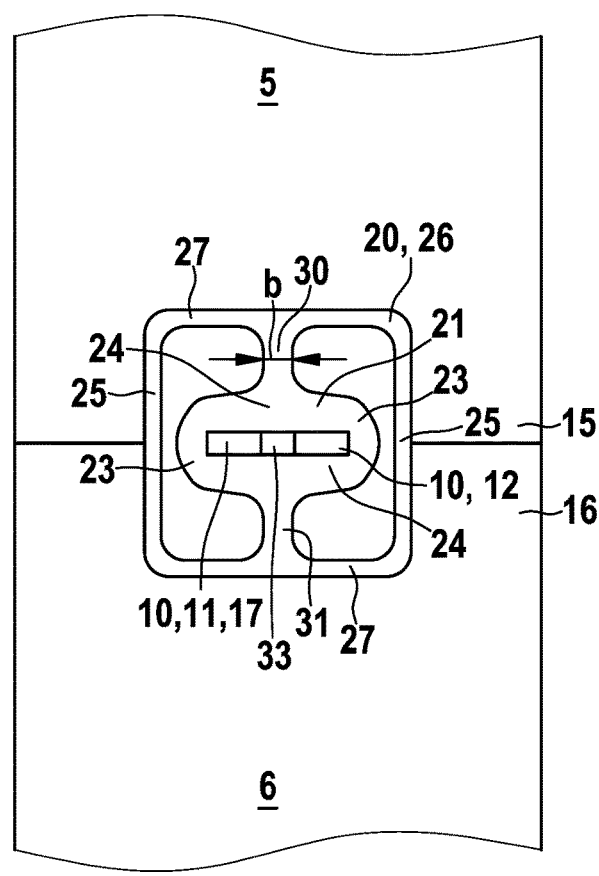
FIG. 3 shows a top view of the decoupling element pursuant to FIG. 2 and slightly modified with respect to FIG. 2 in the installed state.

The chamfered embodiment of the retaining lugs 11, 12 indicated by a dashed line in FIG. 2 facilitates the fitting of the decoupling element 20 onto the retaining lugs 11, 12. A slightly modified version of the decoupling element 20 with respect to FIG. 2 is shown in FIG. 3, in which the connecting web 33 is surrounded laterally by the retaining lugs 11, 12 in the assembled state. The retaining lugs 11, 12 essentially completely take up the two receiving openings 17.

The mounting of the electric motor 1 or, respectively, the motor housing 4 in the two-parted plastic outer housing 5, 6 takes place via the three connecting lugs 10, which, for example, run out from the motor housing 4. The mounting of motor housing 4 and plastic outer housing 5, 6 to the blower module 3 with the decoupling elements 20 assembled on the connecting lugs 10 is carried out by pressing the cover part 6 and the housing longitudinal part 5 together until the clip closures 7 of the cover part 6, which are depicted in FIG. 1, engage behind detent hooks 8 provided on the housing longitudinal part 5. In so doing, the decoupling elements 20 are tensioned in the interior of the electric motor 1 between the receptacles 15, 16, which are indicated in FIG. 2 and are configured in the cover part 6 and in the housing longitudinal part 5, and between a lateral surface 9 of the motor housing 4. It is thereby ensured that the motor housing 4 does not come into any direct contact with the plastic outer housing or rather with the housing longitudinal part 5 and the cover part 6. The motor housing 4 comprising the internal drive thereof is therefore only spatially attached in the plastic outer housing 5, 6 by means of the decoupling elements 20. In so doing, the oscillations caused by the magnetic circuit as well as unbalance are damped and not transferred to the plastic outer housing 5, 6. The result is a low-noise operation of the blower module 3. In addition, the decoupling elements ensure that vibrational loads, as, for example, under severe rough-road conditions, and the resulting acceleration loads are able to be damped. This contributes to a longer service life of the electric motor 1. The electric motor 1 is held with the plastic outer housing 5, 6 thereof in a provided opening of the blower module 3 or a carrier 14 provided for this purpose, for example, by means of a bayonet locking device 22.

The decoupling element 20 shown in FIG. 2 pursuant to a first exemplary embodiment according to the invention serves as a resilient intermediate layer between the motor housing 4 and the, for example, three attachment points thereof in the plastic outer housing 5, 6. The decoupling elements 20 act as rubber springs and achieve a vibration and noise damping effect during operation of the electric motor 1. The low-vibration and respectively low-noise operation of the blower module 3 requires a geometry of the decoupling elements 20 which is optimized to and coordinated with the associated receptacles in the outer housing 5,6, for example a cover receptacle 15 and a housing longitudinal part receptacle 16. In addition, the shape and the dimensions of the pole pot lugs or rather connecting lugs 10, respectively retaining lugs 11, 12, have to be taken into account. A suitable material selection of the decoupling elements 20, as regards Shore hardness and dynamic damping, can substantially influence the oscillation behavior of the blower module 3 or more specifically that of the electric motor 1. In order to eliminate the risk of a collision between attachment lug or, respectively, connecting lug 10 and the outer housing 5, 6 and in order to be able to rule out too severe of a deformation of the decoupling elements 20, the geometry of the receptacles 15, 16 of the decoupling element 20 in the cover part 6 and in the housing longitudinal part 5 must be configured such that the connection between said decoupling element 20 and said housing longitudinal part 5 or said cover part 6 covers as large an area as possible. An extensive connection prevents said decoupling element 20 from having only a partially active or partially load-bearing role, as, for example, by means of edge pressure. Said decoupling element 20 should rather be as completely load-bearing as possible. This leads to little, regionally permanent deformation of said decoupling element 20 and therefore to the maintenance of the complete functionality thereof.

At an operating temperature of 80 degrees Celsius, the rigidity of the decoupling elements 20 consisting preferably of an elastomer is severely reduced. In order to nevertheless rule out a collision between outer housing 5, 6 and connecting lug 10, the latter must be surrounded as completely as possible by the sleeve-shaped, especially rectangularly configured or ashlar-formed, casing part 21 of the decoupling element. Large deflections of the motor housing 4 or the connecting lug 10 are intercepted and damped by the short lateral walls 23 of the casing part 21 as well as by the opposing side walls 25 of an outer part 26 surrounding said casing part 21 in the form of a frame. Said casing part 21 and the outer part 26 are connected to one another via at least one web 30, 31. The web 30, 31 extends from the center of said casing part 21 in the direction of a longitudinal axis 19 of the electric motor 1. The geometry of the decoupling element 20, of the connecting lug 10 on the motor housing 4 as well as the receptacles 15, 16 on the housing longitudinal part 5 and on the cover part 6 are to be selected such that the contact surface area between decoupling element 20 and receptacles 15, 16 is as large as possible. The following advantages are thereby achieved. On the one hand, regional contact pressure points due to edge pressure and the resulting permanent deformations are avoided. On the other hand, a risk of collision is avoided as a result of the connecting lugs 10 being completely encased by the casing part 21. In addition, improved damping properties can be achieved by means of larger contact surfaces between the receptacles 15, 16 and the decoupling element 20.

When designing the geometry of the decoupling element 20, care should primarily be taken that a reasonable balance be struck between the requirements for NVH (noise, vibration, harshness: designation for oscillations in motor vehicles which can be heard as noises or sensed as vibrations) and those for rigidity. Thus, a high degree of damping leads to a good control of NVH. A sufficiently high rigidity leads to a stable motor position or particularly to a stable position of the motor housing 4 and thereby to a lower risk of collision in the plastic outer housing 5, 6. A high degree of damping and a high degree of rigidity depend upon the materials used but cannot be achieved at the same time. By encasing 23, 24 the connecting lug 10 by means of the casing part 21 as well as the opposing side walls 25 or the transverse walls 27 of the outer part 26, a collision between the connecting lug 10 and the plastic outer housing 5, 6 can be completely ruled out in an advantageous manner during the operation of the electric motor 1. Obtaining the rigidity of the decoupling element 20 necessary for the optimal operation of the blower module 3 can be carried out in a coordinated way by varying the web width b of the webs 30, 31 of the casing part 21 with respect to the outer part 26. As depicted in FIG. 2, the webs 30; 31 can be embodied so as to thicken towards transverse walls 24 of the casing part 21 and towards transverse walls 27 of the outer part 26 so that curves take shape. The decoupling element 20 is embodied substantially flat and can, for example, fit snugly against the lateral surface 9 of the motor housing 4, wherein two dumbbell-shaped or paper clip-shaped openings are formed between casing part 21 and outer part 26.

As is depicted in FIG. 3, in a somewhat modified exemplary embodiment of the decoupling element pursuant to FIG. 2, the webs 30, 31 can also be embodied having a smaller web width b and smaller curves than in FIG. 2. Components which are the same or serve the same purpose are generally always labeled with the same reference numerals. By virtue of the fact that the connection of motor housing 4 comprising connecting lug 10 to the outer housing 5, 6 only takes place via the central webs 30, 31, said webs behave according to the principle of a free oscillator, whereby a maximum oscillation damping occurs.

Figure 4:
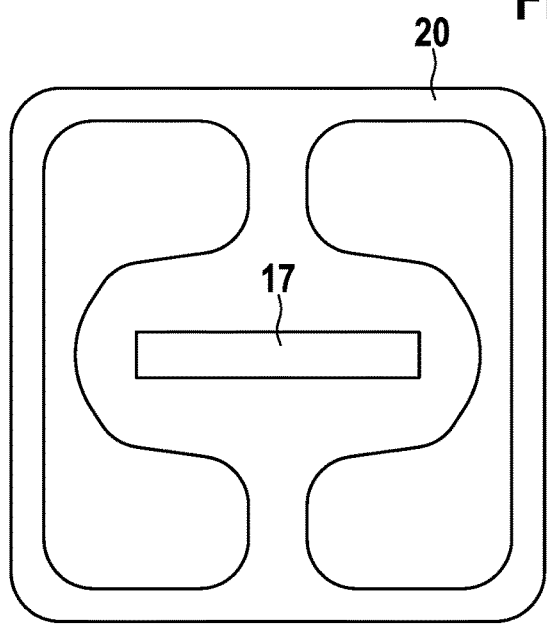
FIG. 4 shows a top view of the decoupling element pursuant to a second exemplary embodiment.

FIG. 4 shows a top view of the decoupling element 20 pursuant to a second exemplary embodiment in the unassembled state, in which in contrast to the decoupling element 20 pursuant to FIGS. 2 and 3, the casing part 21 is embodied without a connecting web 33 pursuant to FIGS. 2 and 3; and therefore a continuous receiving slot or more particularly continuous receiving opening 17 is present for receiving the connecting lug 10 which is then embodied as one piece, in the shape of a flat ashlar or in the shape of a plate. The continuous receiving slot embodied without connecting web 33 or, respectively, the rectangularly shaped receiving opening 17 facilitates a simplified mounting of the decoupling element 20 onto the connecting lug 10.

Figure 5:
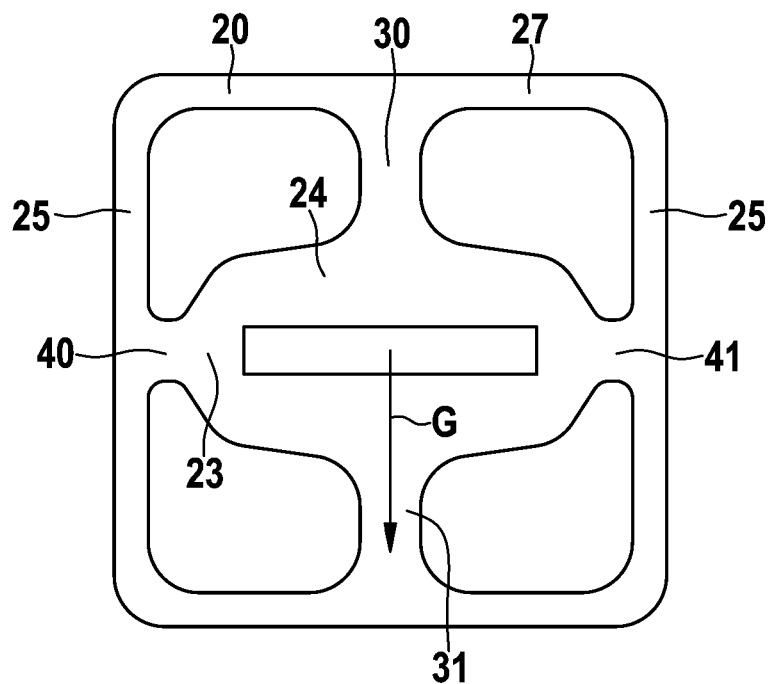
FIG. 5 shows a top view of the decoupling element pursuant to a third exemplary embodiment.

FIG. 5 show a top view of the decoupling element 20 pursuant to a third exemplary embodiment, in which transversely extending transverse webs 40, 41 are provided in addition to the longitudinal webs 30, 31. The transverse webs 40, 41 connect the casing part 21 in extension of the receiving slot or the receiving opening 17 to the outer part 26 comprising the transverse walls 27. It is possible by means of the additional two transverse webs 40, 41 to implement the rigidity of the decoupling element 20 as independently as possible from a blower module position. The weight force G of the motor housing 4 or, respectively, of the drive elements accommodated therein can then be taken up by the longitudinal webs 30, 31 or the transverse webs 40, 41 depending upon the ensuing mounting position. It is also possible to differently configure the web width and web length of longitudinal web 30; 31 and transverse web 40; 41.

As depicted in FIGS. 4 to 9a, 9b, the casing part 21 without a connecting web surrounds the connecting lug 10 so that practically a continuous receiving slot or, respectively, receiving opening 17 is present. It is thereby possible to also use a one-piece embodiment of the connecting lug 10 (not depicted) besides the two-piece embodiment of the connecting lug 10 comprising the retaining lugs 11, 12. It is, of course, also possible in modifications that are not depicted to embody all of the decoupling elements 20 of FIGS. 4 to 9a, 9b comprising casing part 21 with a centered connecting web 33; and therefore two retaining lugs 11, 12 are required for mounting the decoupling element 20 as is the case in FIGS. 2 and 3.

Figure 6:
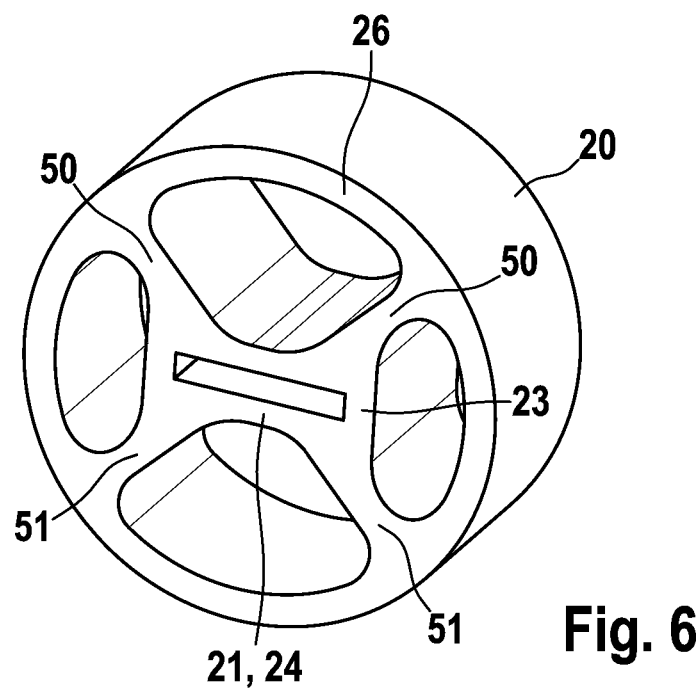
FIG. 6 shows a perspective view of the decoupling element pursuant to a fourth exemplary embodiment.

FIG. 6 shows a perspective view of the decoupling element 20 pursuant to a fourth exemplary embodiment, in which four diagonal webs 50, 51, which extend outward from the corner regions of the casing part 21 to the outer part 26, are provided instead of longitudinal and transverse webs. The outer part 26 is thereby embodied in a round shape so that overall a disc-shaped form results for the decoupling element 20. The diagonal webs 50, 51 can be configured having identical web width or also having different web width.

Figure 7:
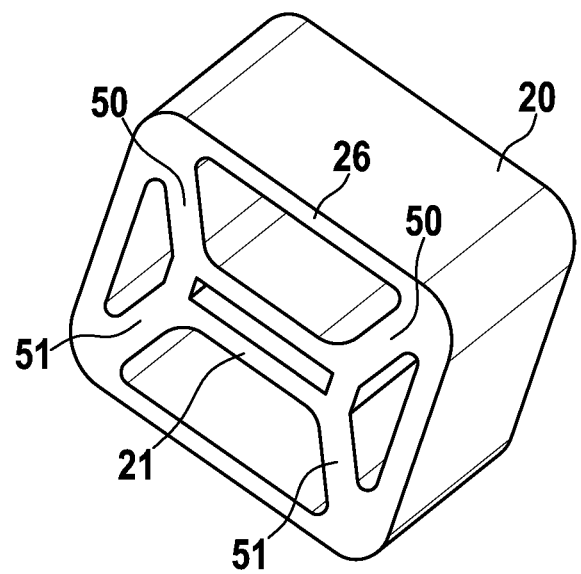
FIG. 7 shows a perspective view of the decoupling element pursuant to a fifth exemplary embodiment.

FIG. 7 shows a perspective view of the decoupling element 20 pursuant to a fifth exemplary embodiment, in which four diagonal webs 50, 51 are provided as in FIG. 6, which extend diagonally or obliquely outward from the corner regions of the casing part 21 to the outer part 26. Said outer part 26 has a square configuration so that overall a square-shaped body results for the decoupling element 20. The diagonal webs 50, 51 can be configured having identical web width or also having different web width.

Figure 8:
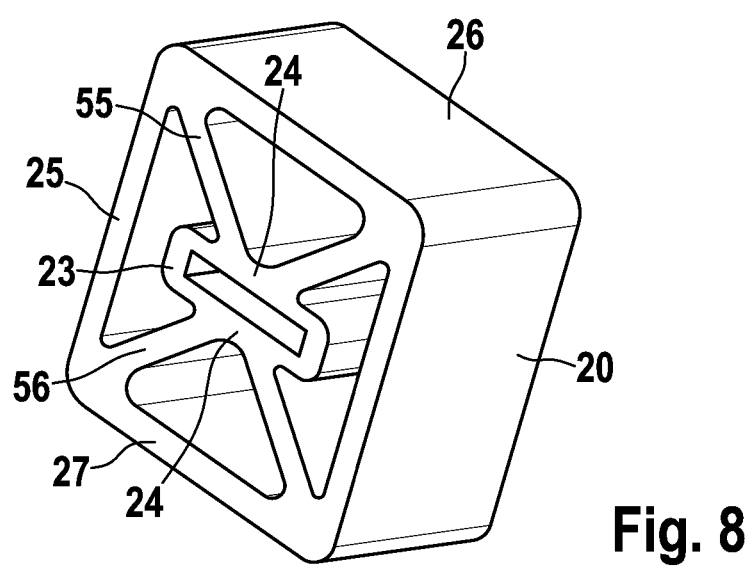

FIG. 8 shows a perspective view of the decoupling element 20 pursuant to a sixth exemplary embodiment, in which four diagonal webs 55, 56 are provided as in FIGS. 6 and 7, which, however, extend outward from the middle of the transverse walls 24 of the casing part 21 at an angle of, for example, 45 degrees. The diagonal webs 55, 56 connect the casing part 21 to the outer part 26 in an x-like pattern. The outer part 26 has a square configuration; and therefore overall a square-shaped body results for the decoupling element 20.

FIGS. 9a and 9b show a perspective depiction of the decoupling element 20 in a lateral view pursuant to a seventh exemplary embodiment. The decoupling element 20 has diagonal webs 50, 51 similar to those in FIG. 7; however, the casing part 21 is embodied so as to be elongated with respect to the outer part 26 or, respectively, has a greater extension or thickness D in the x-direction of a plotted coordinate system. As a result of the casing part 21 which protrudes from a surface plane 60 of the outer part 26 or, respectively, is elongated vis-à-vis said outer part, a contact results between motor housing 4 and decoupling element 20 only via an annular surface 45 formed by the lateral walls 23 and the transverse walls 24. The casing part 21 is mounted onto the retaining lugs 11, 12 as in the other exemplary embodiments, wherein the annular surface 45 abuts against the lateral surface 9 of the motor housing 4. The contact between plastic outer housing 5, 6 and the decoupling element 20 occurs via an outer lateral surface 46 of the outer part 26, for which corresponding receptacles in the plastic outer housing 5, 6 are to be provided. As depicted in FIG. 9a, a higher translational resilience of the decoupling element 20 can be facilitated in the x-, y- and z-direction by means of the offset between the casing part 21 and the outer part 26. Thus, a smaller stimulation of the outer part 26 or more precisely of the border thereof comprising the outer lateral surface 46 and thereby of the plastic housing 5, 6 in the blower module 3 results.

The invention is not limited to the depicted square shape of the decoupling element 20. It is also possible for provision to be made for a rectangular shape or also a round shape for the outer part 26. Besides the variant depicted, it is also possible to implement further combinations of longitudinal and transverse webs or further combinations of diagonal webs having a square, rectangular or round shape for the outer part 26. In addition, the casing part 21 with connecting lug 33 or also without connecting lug can be embodied such that divided retaining lugs 11, 12 or undivided connecting lug 10 can be used.

The apparatus for oscillation-decoupled mounting of an electric motor is particularly intended for blower motors of air conditioning systems in motor vehicles.

What is claimed is:

1. An apparatus for oscillation-decoupled mounting of an electric motor, wherein the electric motor has a motor housing, which has at least one connecting lug, which protrudes radially from the motor housing and on which a decoupling element is fitted, via the decoupling element, the motor housing is supported on an outer housing, characterized in that the decoupling element (20) surrounds the connecting lug (10; 11, 12) with a sleeve-shaped casing part (21), wherein the casing part (21) is supported via at least one web (30, 31; 40, 41; 50, 51; 55, 56) on an outer part (26), which surrounds the casing part (21) in the form of a frame and is accommodated in the outer housing (5, 6), wherein at least two webs are provided, which extend in a longitudinal direction (19) of the electric motor (1) outward from the casing part (21) to the outer part (26) of the decoupling element (20), and wherein the casing part (21) is rectangularly configured.

2. The apparatus according to claim 1, characterized in that two further transverse webs (40, 41) are provided, which extend transversely to the longitudinal direction (19) of the electric motor (1) outward from the casing part (21) to the outer part (26) of the decoupling element (20).

3. The apparatus according to claim 1, characterized in that a receiving opening (17) of the sleeve-shaped casing part (21) is designed in a continuous manner.

4. The apparatus according to claim 1, characterized in that the casing part (21) has an additional connecting web (33) and in that the connecting lug (10) is divided into two retaining lugs (11), which engage into receiving openings (17) cut out of the casing part (21).

5. The apparatus according to claim 1, characterized in that the outer part (26) has a square, rectangular or round shape.

6. The apparatus according to claim 1, characterized in that the outer housing is formed in two parts.

7. An apparatus for oscillation-decoupled mounting of an electric motor, wherein the electric motor has a motor housing, which has at least one connecting lug, which protrudes radially from the motor housing and on which a decoupling element is fitted, via the decoupling element, the motor housing is supported on an outer housing, characterized in that the decoupling element (20) surrounds the connecting lug (10; 11, 12) with a sleeve-shaped casing part (21), wherein the casing part (21) is supported via at least one web (30, 31; 40, 41; 50, 51; 55, 56) on an outer part (26), which surrounds the casing part (21) in the form of a frame and is accommodated in the outer housing (5, 6), wherein diagonal webs (50, 51) are provided, which extend outward from corner regions of the casing part (21) to the outer part (26) of the decoupling element (20), and wherein the casing part (21) is rectangularly configured.

8. The apparatus according to claim 7, characterized in that the casing part (21) is elongated with respect to the outer part (26) such that the casing part (21) accommodating the connecting lug (10) protrudes from a plane (60) spanned by the outer part (26).

9. The apparatus according to claim 7, wherein a receiving opening (17) of the sleeve-shaped casing part (21) is designed in a continuous manner.

10. The apparatus according to claim 7, wherein the outer part (26) has a square, rectangular or round shape.

11. The apparatus according to claim 7, wherein the outer housing is formed in two parts.

12. An apparatus for oscillation-decoupled mounting of an electric motor, wherein the electric motor has a motor housing, which has at least one connecting lug, which protrudes radially from the motor housing and on which a decoupling element is fitted, via the decoupling element, the motor housing is supported on an outer housing, characterized in that the decoupling element (20) surrounds the connecting lug (10; 11, 12) with a sleeve-shaped casing part (21), wherein the casing part (21) is supported via at least one web (30, 31; 40, 41; 50, 51; 55, 56) on an outer part (26), which surrounds the casing part (21) in the form of a frame and is accommodated in the outer housing (5, 6), wherein diagonal webs (55, 56) are provided, which extend outward from a midpoint of a transverse wall (24) of the casing part (21) to the outer part (26) of the decoupling element (20), wherein the casing part (21) is rectangularly configured.

13. The apparatus according to claim 12, wherein a receiving opening (17) of the sleeve-shaped casing part (21) is designed in a continuous manner.

14. The apparatus according to claim 12, wherein the outer part (26) has a square, rectangular or round shape.

15. The apparatus according to claim 12, wherein the outer housing is formed in two parts.

16. An apparatus for oscillation-decoupled mounting of an electric motor, wherein the electric motor has a motor housing, which has at least one connecting lug, which protrudes radially from the motor housing and on which a decoupling element is fitted, via the decoupling element, the motor housing is supported on an outer housing, characterized in that the decoupling element (20) surrounds the connecting lug (10; 11, 12) with a sleeve-shaped casing part (21), wherein the casing part (21) is supported via at least one web (30, 31; 40, 41; 50, 51; 55, 56) on an outer part (26), which surrounds the casing part (21) in the form of a frame and is accommodated in the outer housing (5, 6), wherein the casing part (21) has an additional connecting web (33) that extends in the middle of the casing part (21) such that an opening in the middle of the casing part (21) is divided into two receiving openings (17), and wherein the connecting lug (10) is divided into two retaining lugs (11), which respectively engage into the two receiving openings (17).

17. The apparatus according to claim 16, wherein the outer part (26) has a square, rectangular or round shape.

18. The apparatus according to claim 16, wherein the outer housing is formed in two parts.

19. The apparatus according to claim 16, wherein the casing part (21) is spaced from the outer part (26) in a radial direction, and wherein the at least one web (30, 31; 40, 41; 50, 51; 55, 56) radially extends between the casing part (21) and the outer part (26).

20. The apparatus according to claim 16, wherein the additional connecting web (33) extends in the center of the middle of the casing part (21) such that the two receiving openings (17) are evenly sized.

\* \* \* \* \*